US006830453B2

(12) United States Patent
Jung

(10) Patent No.: US 6,830,453 B2
(45) Date of Patent: Dec. 14, 2004

(54) APPARATUS FOR TURNING PAGES OF BOOK

(76) Inventor: Nam Su Jung, 8-555 Hongeun-dong, Seodaemun-gu, Seoul 120-100 (KR)

( * ) Notice: Subject to any disclaimer, the term of this patent is extended or adjusted under 35 U.S.C. 154(b) by 94 days.

(21) Appl. No.: 10/182,741

(22) PCT Filed: Dec. 19, 2001

(86) PCT No.: PCT/KR01/02215

§ 371 (c)(1),
(2), (4) Date: Aug. 15, 2002

(87) PCT Pub. No.: WO02/49858

PCT Pub. Date: Jun. 27, 2002

(65) Prior Publication Data

US 2003/0003429 A1 Jan. 2, 2003

(30) Foreign Application Priority Data

Dec. 21, 2000 (KR) ........................................ 2000/79696

(51) Int. Cl.$^{7}$ ................................................ G09B 17/00

(52) U.S. Cl. ......................... 434/178; 434/365; 40/531; 84/519

(58) Field of Search ................................ 434/169, 178, 434/365; 40/457, 475, 476, 486, 531; 84/486, 487, 503, 519; 358/474, 497; 355/75; 235/379; 248/444.1; 400/27

(56) References Cited

U.S. PATENT DOCUMENTS

| | | | | | |
|---|---|---|---|---|---|
| 3,808,720 A | * | 5/1974 | Smith | | 40/457 |
| 3,823,638 A | * | 7/1974 | Bombardi | | 84/503 |
| 4,072,080 A | * | 2/1978 | Conlin | | 84/486 |
| 4,663,873 A | * | 5/1987 | Shinbrot | | 40/531 |
| 4,685,374 A | * | 8/1987 | Goldner | | 84/487 |
| 4,719,712 A | * | 1/1988 | Moreau et al. | | 40/475 |
| 4,870,258 A | * | 9/1989 | Mochizuki et al. | | 235/379 |
| 4,916,839 A | * | 4/1990 | Nakanishi | | 40/475 |
| 4,936,034 A | * | 6/1990 | Chen et al. | | 40/531 |
| 5,247,755 A | * | 9/1993 | Sato et al. | | 40/476 |
| 5,493,943 A | * | 2/1996 | Horikawa | | 84/519 |
| 5,575,097 A | | 11/1996 | Chou et al. | | |
| 5,583,662 A | * | 12/1996 | Takahashi et al. | | 358/474 |
| 5,614,991 A | * | 3/1997 | Moro et al. | | 355/75 |
| 5,640,252 A | * | 6/1997 | Turner et al. | | 358/497 |
| 6,049,033 A | | 4/2000 | Dallas | | |
| 6,215,058 B1 | * | 4/2001 | Molchak et al. | | 84/486 |
| 6,250,599 B1 | * | 6/2001 | Goldberg | | 248/444.1 |
| 6,398,431 B2 | * | 6/2002 | Kimura et al. | | 400/27 |
| 6,574,014 B2 | * | 6/2003 | Mandel et al. | | 358/474 |

FOREIGN PATENT DOCUMENTS

| | | | | |
|---|---|---|---|---|
| JP | 02063410 A | * | 3/1990 | A47B/23/06 |
| JP | 02215600 A | * | 8/1990 | B42D/9/04 |
| JP | 03197094 A | * | 8/1991 | B42D/9/04 |
| JP | 10058861 A | * | 3/1998 | B42D/9/04 |

* cited by examiner

*Primary Examiner*—Joe H. Cheng
(74) *Attorney, Agent, or Firm*—Bacon & Thomas

(57) ABSTRACT

The present invention provides an apparatus for turning pages of a music book. When a music performer manipulates a power switch, an actuating lever disposed in a housing of the apparatus is raised out of a guide groove of the housing and presses down and carries a right lower end of the page in accordance with an operation of a driving motor interlocked with the actuating lever. At this time, a pressure contact piece is moved in a fore and aft direction with respect to the page to press down or to be separated from the page so that the page can be smoothly turned. The actuating lever continues to pivot leftward along the guide groove to completely turn the page. After completing the operation of turning the page, the actuating lever is separated from the turned page and returns to an initial position along the guide groove.

9 Claims, 11 Drawing Sheets

APPARATUS FOR TURNING PAGES OF BOOK

TECHNICAL FIELD

The present invention relates to an apparatus for turning pages of books, particularly a music book, which is used when a music performer plays a musical instrument. More particularly, the present invention relates to an apparatus for turning pages of a music book which is improved over a conventional apparatus disclosed in the applicant's Korean Patent Application No. 1998-41445 and in which a pressing piece disposed at a top end of an actuating lever of the apparatus turns pages of a music book while the actuating lever pivots on a hinge leftward when a music performer hits a power switch with his/her foot.

BACKGROUND ART

The conventional apparatus disclosed in the aforementioned Korean patent application turns a page of a music book in such a manner that when a music performer manipulates an operation button 14 with his/her foot, an actuating lever 20 is raised upwardly from a support 10 along a guide groove 10*a* by driving force of a motor installed within the support 10 and then pivots along the guide groove 10*a* in a state where a roller 61 fixed to a leading end of the actuating lever 20 presses down the page of the book, as schematically shown in FIGS. 10 and 11.

However, the conventional apparatus has the following disadvantages in view of its operation due to structural defects. In case of a bulky book, when the actuating lever 20 pivots to turn a page of the book, a supporting rod 30 is not timely separated from the page, and thus, the turned page is crumpled or torn. On the contrary, in case of a thin book, when the actuating lever 20 pivots, the supporting rod 30 is separated from the page of the book too early, and thus, one or more pages are turned together.

Further, since the actuating lever 20 takes the shape of a strip, a central portion of the page bulges toward the guide groove 10*a* and comes into contact with an inner surface of the actuating lever 20 when the actuating lever 20 pivots along the guide groove 10*a*. Thus, there is a problem in that since the roller 61 for pressing down the page is spaced apart from the page, the page cannot be smoothly turned.

Moreover, since the supporting rod 30 protrudes upwardly too much from a top surface of the support 10, it is inconvenient to carry or store the apparatus. In addition, since the width of a trajectory of the actuating lever 20 becomes inherently large in view of its structure, the width of the guide groove 10 becomes also large. Therefore, there is another operational problem in that the page of the book is caught in the guide groove.

DISCLOSURE OF INVENTION

Accordingly, the present invention is conceived to solve the problems as mentioned above. An object of the present invention is to provide an apparatus for turning pages of a book, wherein whenever a user manipulates a power switch to supply electric power to a motor, an actuating lever presses down and carries the page of the book to correctly turn pages of the book while pivoting along a guide groove and then returns to an initial position, so that the user can concentrate his/her attention on his/her performance of a music instrument.

Another object of the present invention is to provide an apparatus for turning pages of a book, wherein when an actuating lever turns the page of the book and then returns to the initial position, the actuating lever can be prevented from interfering with adjacent components densely disposed in a narrow space within a body of the apparatus and thus can be smoothly operated.

A further object of the present invention is to provide an apparatus for turning pages of a book, wherein the width of a groove for guiding of an actuating lever is minimized to prevent the page from being caught in the guide groove and foreign materials such as dust from being introduced into the guide groove, and flexibility in a product design can be increased.

A still further object of the present invention is to provide an apparatus for turning pages of a music book, wherein a pressing piece of an actuating lever for contacting and carrying a central lower portion of the page of the book is properly controlled in view of its contacting/separating direction and contact time so as to prevent the pressing piece from slipping on the page of the book and the page from being turned back due to contact with the pressing piece when the actuating lever returns an initial position.

In order to achieve the above objects, an apparatus for turning pages of a book includes a housing in which a geared motor rotatable in forward and reverse directions and associated with an actuating lever driven when a user applies electric power thereto is installed and a backing plate for supporting the book thereon is formed; and a cover of the housing provided with a guide groove for guiding the actuating lever and with a supporting piece for fixing the page of the book which has been turned. The apparatus further comprises a rotational-direction changing unit having a guider formed on a side of a reduction gear for finally reducing a rotational speed of the geared motor; a pivoting unit having the actuating lever of which a lower end is hingedly secured on a pivoting shaft and the other upper end is formed with a pressing piece fixed thereto and which extends through a guide slot; a pressing/restraining unit having a helical depressing piece which surrounds the other upper end of the actuating lever and of which a lower end is fixed through a pin to a fixing member that is fixed through a pin to the body, and elastic members connected to the fixing member and a lower end of the depressing piece, respectively; and a contacting/releasing unit having a stopper interlocked with a crankshaft, and a pressure contact member connected through a wire and an elastic member to the stopper and connected to an elastic member so that the pressure contact member can pivot in a fore and aft direction.

BEST MODE FOR CARRYING OUT THE INVENTION

Figure 1:
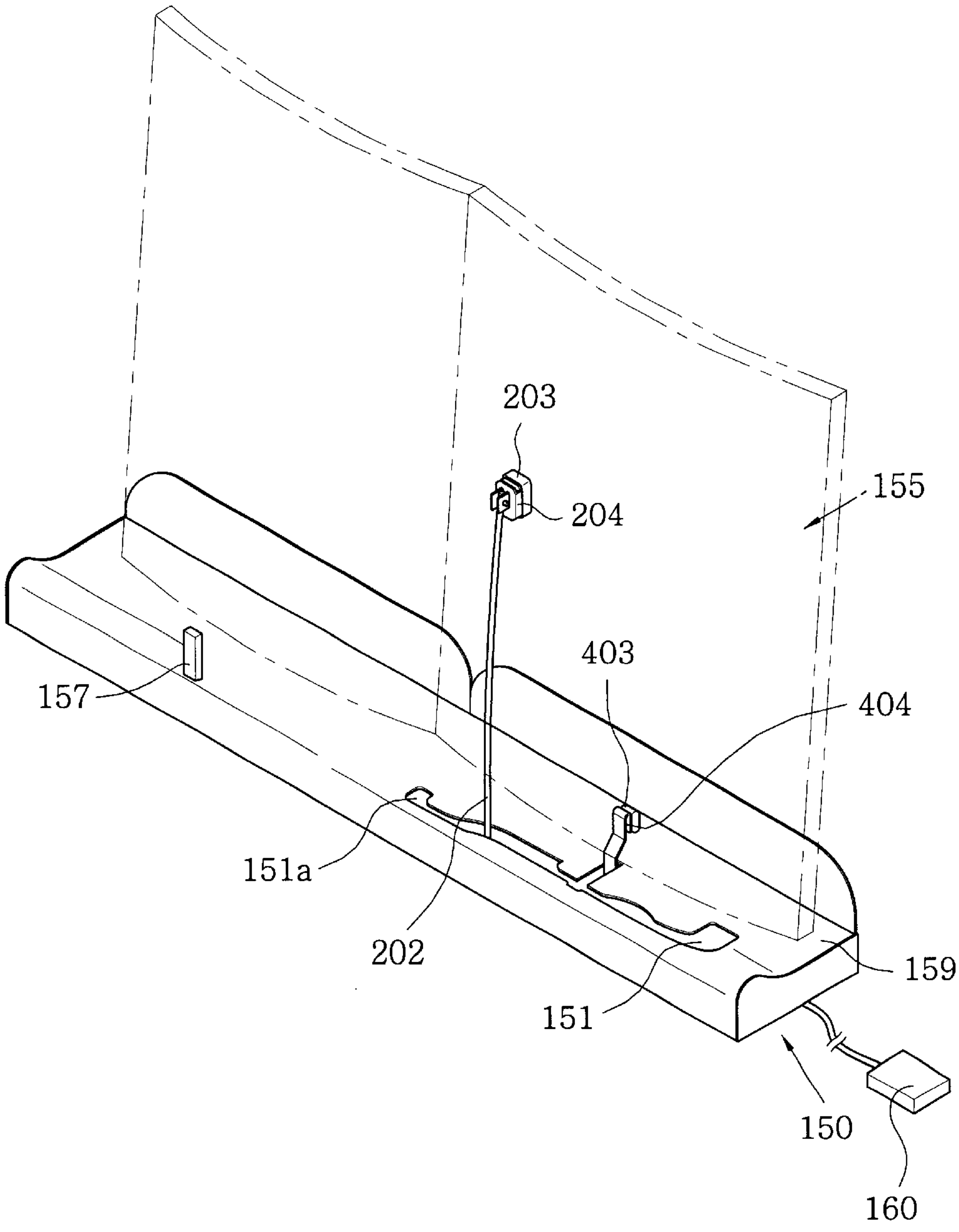
FIG. 1 is a schematic view of an apparatus for turning pages of a book according to the present invention.

Hereinafter, a preferred embodiment of the present invention will be described in detail with reference to the accompanying drawings. It should be understood that the embodiment is described for illustrative purposes only so that those skilled in the art can easily work the present invention, and does not limit the technical spirit and scope of the invention.

As shown in FIGS. 1 to 9, an apparatus for turning pages of a book according to the present invention comprises a housing in which a geared motor associated with an actuating lever driven when a user applies electric power thereto is installed and a backing plate for supporting the book thereon is formed; and a cover of the housing provided with a guide groove for guiding the actuating lever and with a supporting piece for fixing a page of the book which has been turned.

According to a preferred embodiment of the present invention, a direction changing unit 100 of the apparatus comprises a geared motor 101 driven in forward and reverse directions depending on manipulation of a power switch 160, an intermediate gear 105 engaged with the geared motor 101 for reducing a rotational speed of the geared motor 101, a reduction gear 102 engaged with the intermediate gear 105 for performing final reduction, and a guider 103 fixed to a side of the reduction gear 102 and provided with an elongated guide slot 104 formed at a predetermined angle in a fore and aft direction. The guider 103 allows the actuating lever 202 extending through the guide slot 104 to be slid and pivoted in the fore and aft direction within the guide slot 104 in accordance with the forward and reverse rotation of the reduction gear 102.

A pivoting unit 200 comprises the actuating lever 202 of which one end (left end in FIGS. 2 and 3) is coupled through a pin with a central portion of a crank of a pivoting shaft 201 installed on the left side of the interior of the housing 150. The actuating lever 202 is interlocked with the guider 103 by extending through the elongated guide slot 104 of the guider 103 so as to be pivoted in accordance with the forward and reverse rotations of the guider 103. In addition, the actuating lever 202 takes the shape of a rod in which a central portion thereof is curved toward a front portion of the housing 150 and the other end thereof (right end in the figures) is provided with an inverted U-shaped elastic piece 204 with a pressing piece 203 attached thereto.

The pivoting unit 200 further comprises an elastic member 205 fixedly coupled with one end of the pivoting shaft 201 and the left end of the actuating lever 202 to prevent the actuating lever 202 from being freely slid within the slanted and elongated guide slot 104 and to generate tension for pulling the actuating lever 202 toward a rearward edge of the guide groove 151.

A pressing/restraining unit 300 comprises a helical depressing piece 301 of which one end (left lower end) is coupled with a pin 305 hingedly fitted into upper and lower pin holes of a fixing member 303. A side end of the fixing member 303 is connected through a pin 302 to a supporting portion formed on the housing 150 to be pivoted with respect to the housing 150 in an up and down direction. The pressing/restraining unit 300 further comprises elastic members 304 and 306 of which one ends are secured to a left lower end of the depressing piece 301 and an aperture on a side of the fixing member 303, respectively, and the other ends are fixed to respective projections formed on the right side of a floor of the housing 150. The elastic members 304 and 306 generate downward tension rearwardly from the front of the housing 150. Thus, the elastic members 304 and 306 restrain a play of the depressing piece 301 in such a manner that when the actuating lever 202 is pivoted from an initial position, the right end of the actuating lever 202 is caused to be pulled toward and brought into close contact with a right lower end portion of the page of the book 155 placed on the housing 150 along a helical portion of the depressing piece 301; and that when the actuating lever 202 is returned to the initial position after completion of its operation, the right end of the actuating lever 202 is caused to be safely positioned on an inner surface of the helical portion of the depressing piece 301.

A contacting/releasing unit 400 comprises a pressure contact member 402 which is hingedly fixed to a supporting portion of the housing 150 to be pivotable in the fore and aft direction of the housing 150 and in which a pressure contact piece 403 is fixed to an inverted U-shaped elastic piece 404; an elastic member 411 of which one end is secured on the hinge portion of the pressure contact member 402 and the other end is secured on a front portion of the housing 150 to exert tension toward the front of the housing 150; and a crankshaft 401 connected to the intermediate gear 105 for controlling a contacting/separating direction and contact time of the pressure contact member 402 which overcomes the tension of the elastic member 411 and presses down a central lower portion of the page. The contacting/releasing unit 400 further comprises a wire 406 which is fixed to the hinge portion of the pressure contact member 402, turned by 90 degrees around a fixed shaft 405 and connected to one end of an elastic member 410. The other end of the elastic member 410 is fixed to a pin that is slid within elongated slots in pin supporting members formed on the housing 150. The contacting/releasing unit 400 further comprises a stopper 409 constructed such that when the pressure contact member 402 comes into close contact with the page of the book, the crankshaft 401 rotates counterclockwise from the right side of a second hook piece 408 to cause the stopper 409 to be moved in the left direction against the tension of the elastic member 411, so that a first hook piece 407 of the stopper 409 is caught in a fixing piece 156 formed on the housing 150; and that when the pressure contact member 402 is separated from the page of the book, the crankshaft 401 rotates clockwise from the left side of the second hook piece 408 to cause the stopper 409 to be raised in the right direction, so that the first hook piece 407 of the stopper 409 is released from the fixing piece 156.

The apparatus of the present invention further comprises a first switch 153 for converting a rotational direction of the geared motor 101 in such a manner that when the actuating lever 202 pivots along the guide groove 151 and is then positioned at a left end 151*a* of the guide groove 151, the actuating lever 202 comes into contact with the first switch 153 to drive a relay 152; and a second switch 154 for turning off electric power to the geared motor 101 when the actuating lever 202 returns to the initial position and then comes into contact with the second switch 154.

The reference numeral 157 designates a supporting piece for preventing a page of the book, which has been turned by the actuating lever 202, from returning to an original position of the page. The reference numeral 158 designates a battery for supplying the electric power to the geared motor 101. The reference numeral 165 designates a guide piece with a U-shaped slit for guiding the actuating lever 202 into to the initial position to be seated therein.

The reference numeral 166 designates a crank-shaped guide piece of which one end is fixed to the housing 150 and the other end is raised to an initial height of the pressing piece 203 in order to ensure that the smooth raising from and seating to the initial position of the pressing piece 203 and which has a roller rotatably fitted over a portion of the other end to be in contact with the pressing piece 203. The reference numeral 167 designates a guide member with a forward slant surface for ensuring that the actuating lever 202 is safely and correctly seated upon its return to the initial position.

Hereinafter, the operation of the apparatus for pages of a book according to the present invention will be described in detail with reference to the accompanying drawings.

Figure 2:
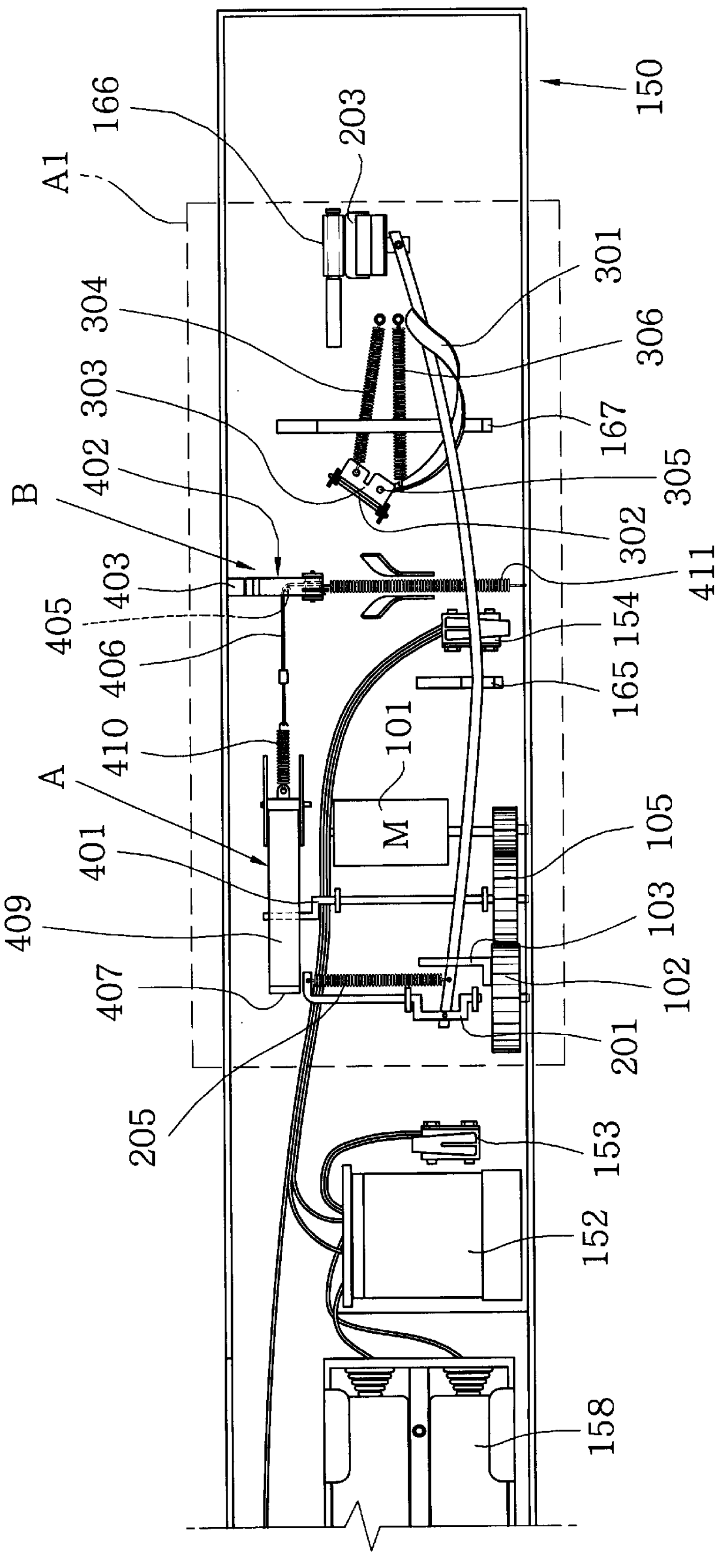
FIG. 2 is a partial plan view of a housing of the apparatus according to the present invention, with a cover removed from the housing.
Figure 3:
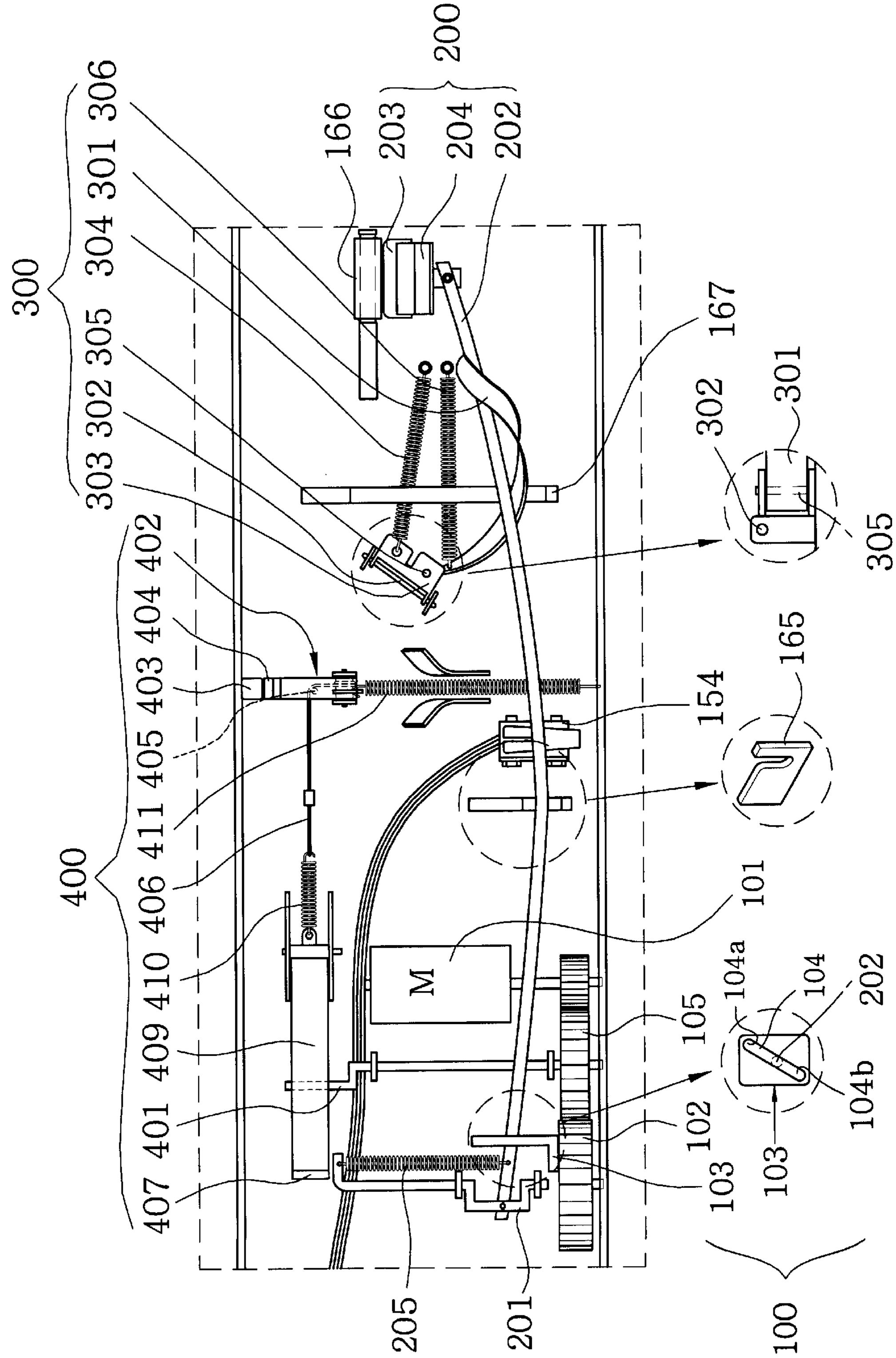
FIG. 3 is an enlarged view of an "A1" portion of FIG. 2, FIGS. 4*a* and 4*b* are side views of "A" and "B" portions of FIG. 2.

As shown in FIGS. 1 to 3, in a state where a book 155 (e.g., a music book) is placed on the cover 159 detachably secured on the housing 150, when the music performer manipulates the power switch 160 with his/her foot, the geared motor 101 installed within the housing 150 is supplied with the electric power and then is driven in the forward direction.

When the geared motor 101 is driven, the guider 103 formed on the side of the reduction gear 102 is rotated in the forward direction with the rotational speed thereof reduced through the intermediate and reduction gears 105 and 102. Thus, the actuating lever 202 of which the lower end is hingedly fixed to the pivoting shaft 201 and which extends through the guide slot 104 is interlocked with the guider 103 and pivots on the hinge pin of the pivoting shaft 201.

At the same time, the actuating lever 202 escapes from the U-shaped slit of the guide piece 165 and is raised out of the guide groove 151 formed in the cover 159, and the pressing piece 203 fixed to the upper end of the actuating lever 202 is moved to the right lower end portion of the page of the book 155.

At this time, the helical depressing piece 301 capable of performing a three-dimensional movement, which is secured to the housing 150 so as to be pivotable in both the left and right direction and the up and down direction, is pivoted while causing the pressing piece 203 of the actuating lever 202 to be pulled toward and in close contact with the right lower portion of the page by means of the tension of the elastic members 304 and 306. Thus, the pressing piece 203 of the actuating lever 202 can push and raise bulgingly the page of the book without slippage thereon.

That is, due to the tension of the elastic member 304 of which the one end is secured to an upper plate of the fixing member 303 vertically pivotably connected through the pin 302 to the supporting portion formed on the floor of the housing 150 and the tension of the elastic member 306 of which the one end is secured to the left lower end of the depressing piece 301 capable of pivoting on the pin 305, the depressing piece 301 is pulled downwardly and rearwardly from the front of the housing 150. Thus, upon initial operation of the actuating lever 202, the depressing piece 301 is caused to be moved to and brought into close contact with the right lower end portion of the page of the book 155 along the helical shape of the depressing piece 301.

At this time, since the actuating lever 202 is moved along the elongated guide slot 104 formed at a predetermined angle in the guider 103 toward a rear end 104*a* of the guide slot 104, the actuating lever 202 can be smoothly moved toward the right lower end portion of the page of the book 155.

Figure 4A:
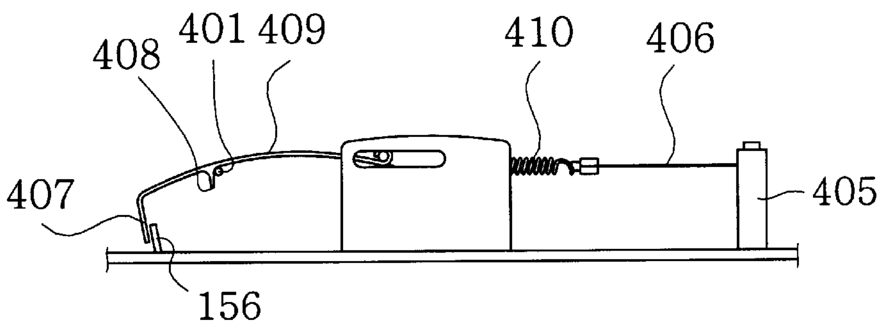
Figure 4B:
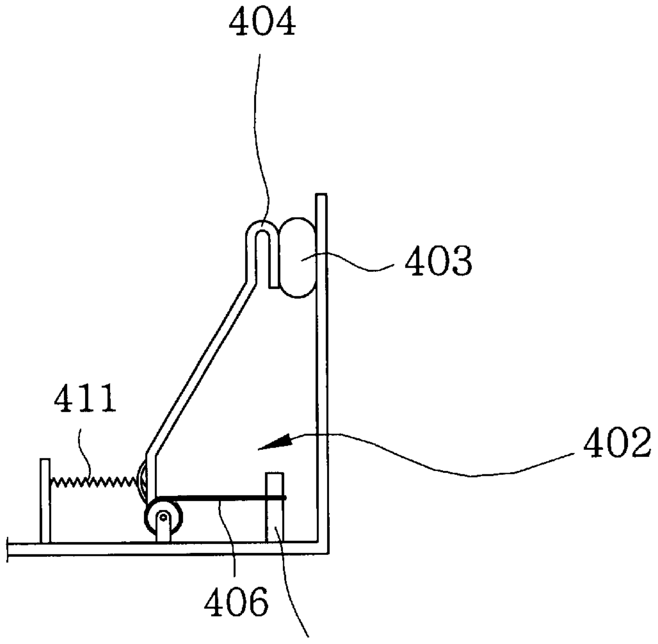
Figure 5:
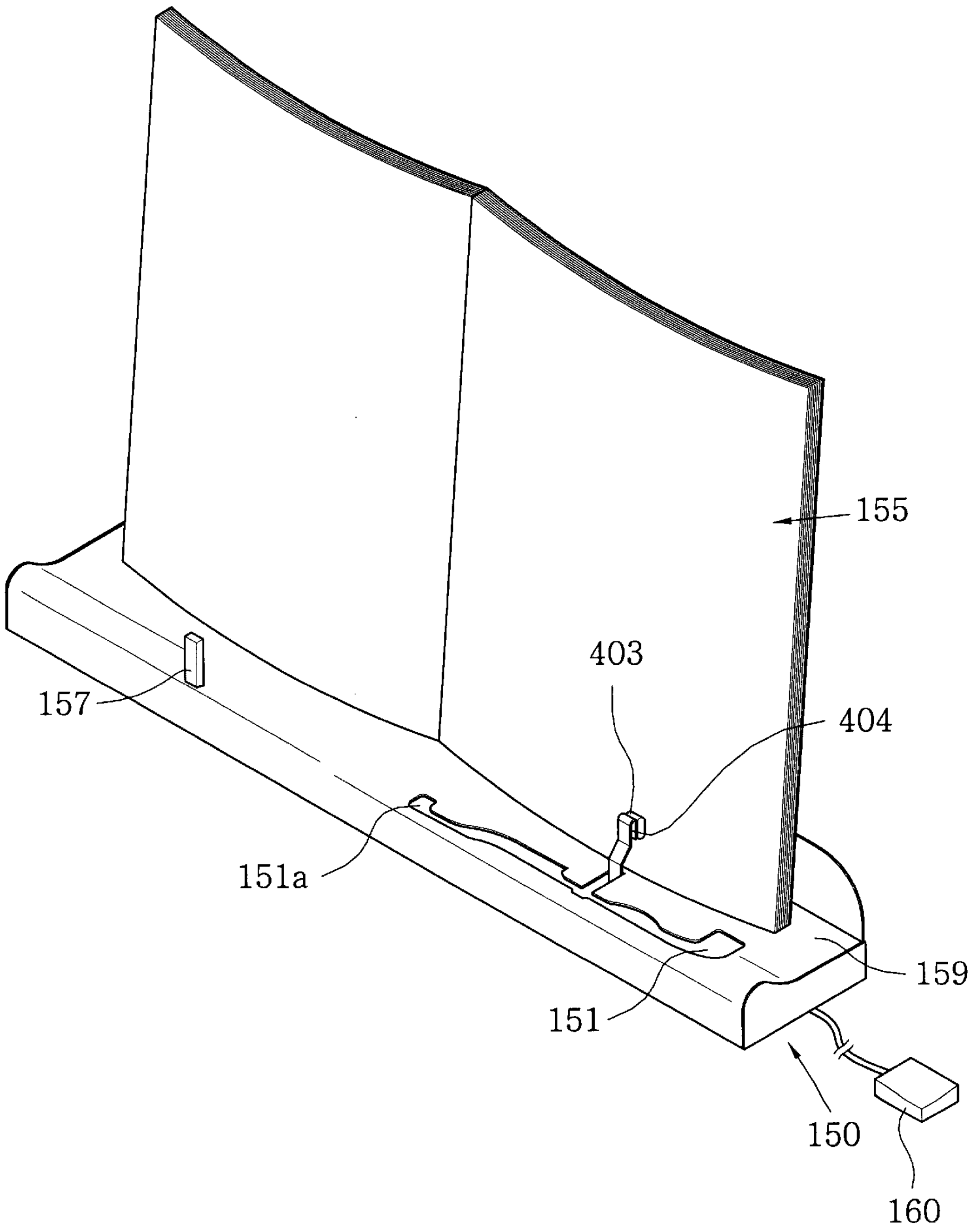
FIG. 5 is a schematic view showing an initial state before turning the page of the book in the apparatus according to the present invention.
Figure 6:
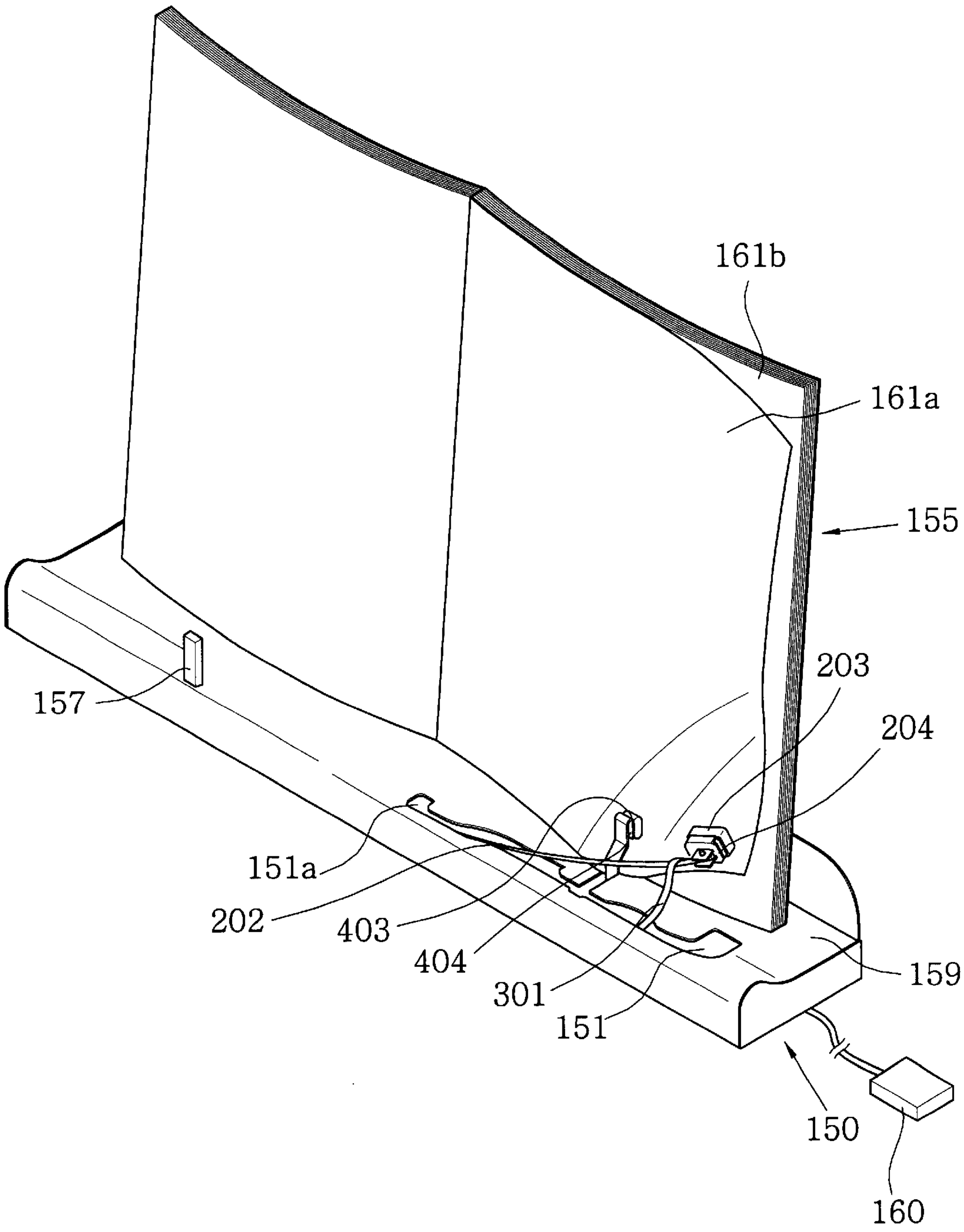
FIG. 6 is a schematic view showing a state where an actuating lever and a pressing piece disposed thereon are moved to an initial position in the apparatus according to the present invention.

Meanwhile, the pressure contact piece 403 of the pressure contact member 402 is moved rearwardly and then presses down the central lower portion of the page 161*a* (see FIGS. 4 to 6). The pivoting of the pressing piece 203 in close contact with the page causes the right lower end of the page to bulge from the central lower portion of the page, so that the page can be easily turned.

The rearward movement of the pressure contact piece 403 is achieved in such a manner that the crankshaft 401 is rotated counterclockwise from the right side of the second hook piece 408 to move the stopper 409 leftward against the tension of the elastic member 411 so that the first hook piece 407 of the stopper 409 is caught in the fixing piece 156 formed on the housing 150.

Figure 7:
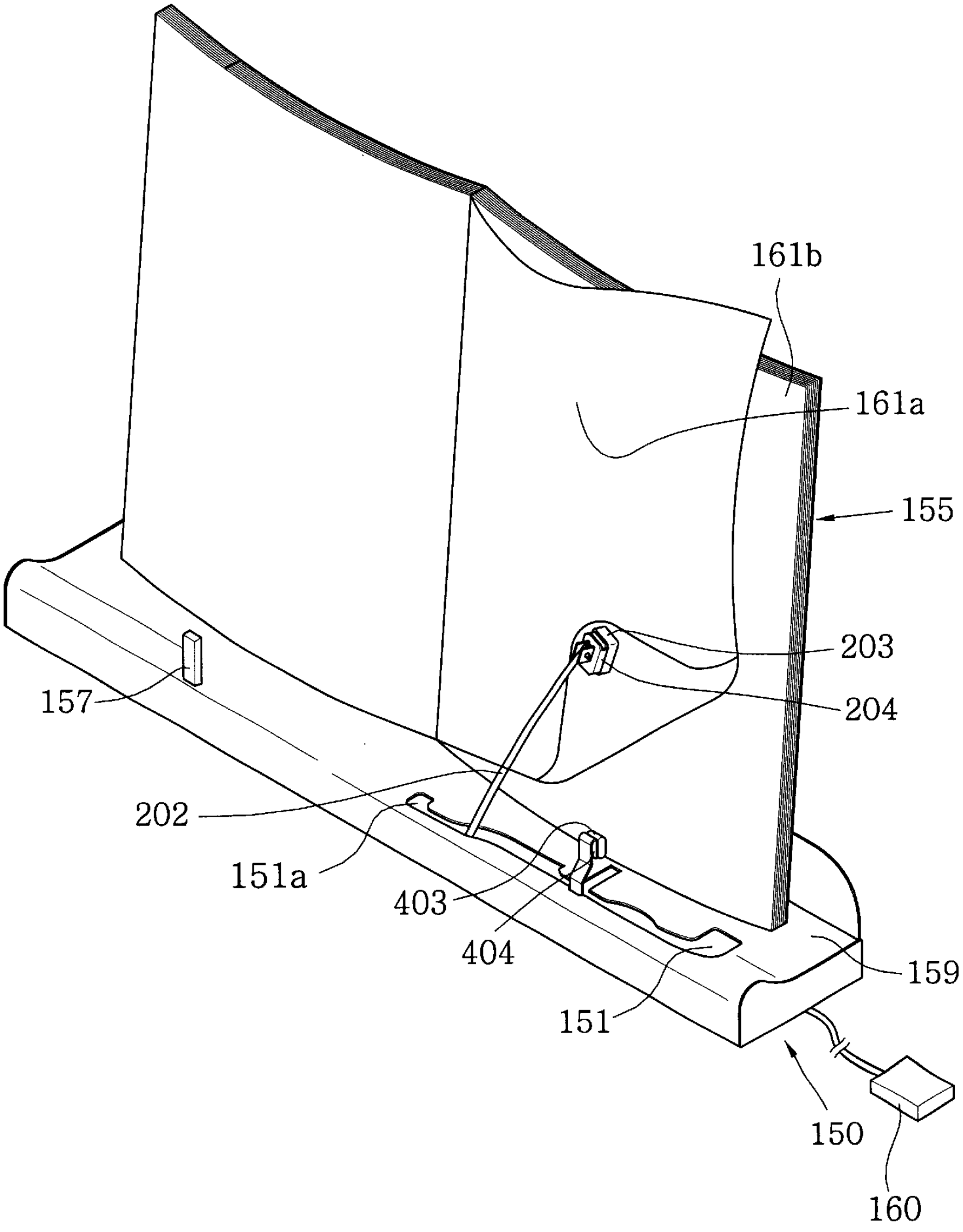
FIG. 7 is a schematic view showing a state where the actuating lever pushes and raises the page of the book in the apparatus according to the present invention.

After the central portion of the page 161*a* has bulged, the pressure contact piece 403 is moved back toward the front of the housing 150, whereas the pressing piece 203 of the actuating lever 202 pushes the right lower end of a back surface of the page 161*a* and simultaneously moves along an arc toward a left upper portion of the book, as shown in FIG. 7.

The forward movement of the pressure contact piece 403 for the release from the pressure contact state with the page is achieved in such a manner that the crankshaft 401 is rotated clockwise from the left side of the second hook piece 408 to cause the stopper 409 to be raised in the right direction and thus the first hook piece 407 formed at one end of the stopper 409 to be released from the fixing piece 156 formed on the housing 150, and consequently, the stopper 409 connected to the wire 406 is moved rightward and the pressure contact member 402 is moved toward the front of the housing 150 due to the tension of the elastic member 411.

Figure 8:
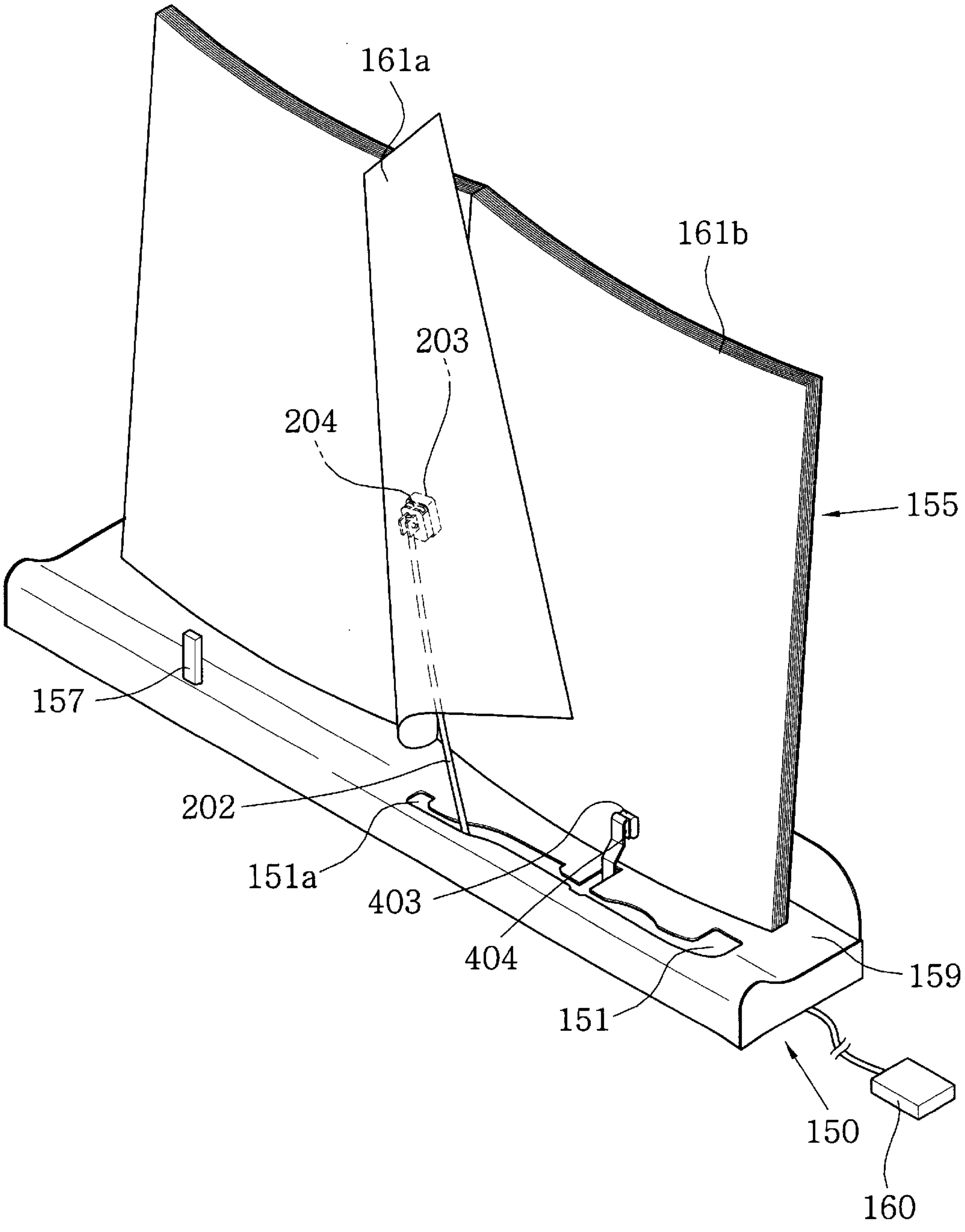
FIG. 8 is a schematic view showing a state where the page of the book is turned halfway in the apparatus according to the present invention.
Figure 9:
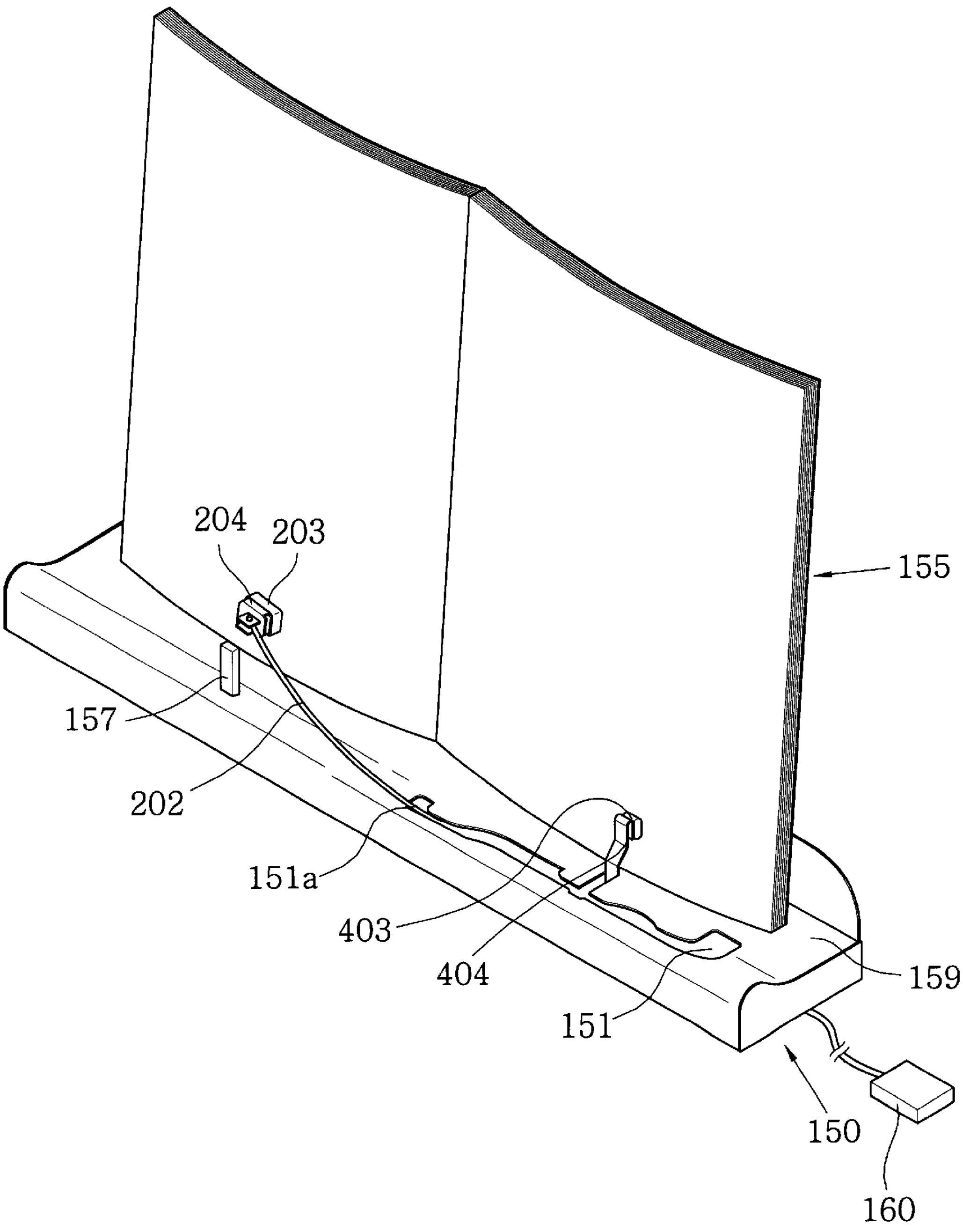
FIG. 9 is a schematic view showing a state where the page of the book has been completely turned in the apparatus according to the present invention, FIG, 10 is a schematic view of a conventional apparatus for turning pages of a book.
Figure 10:
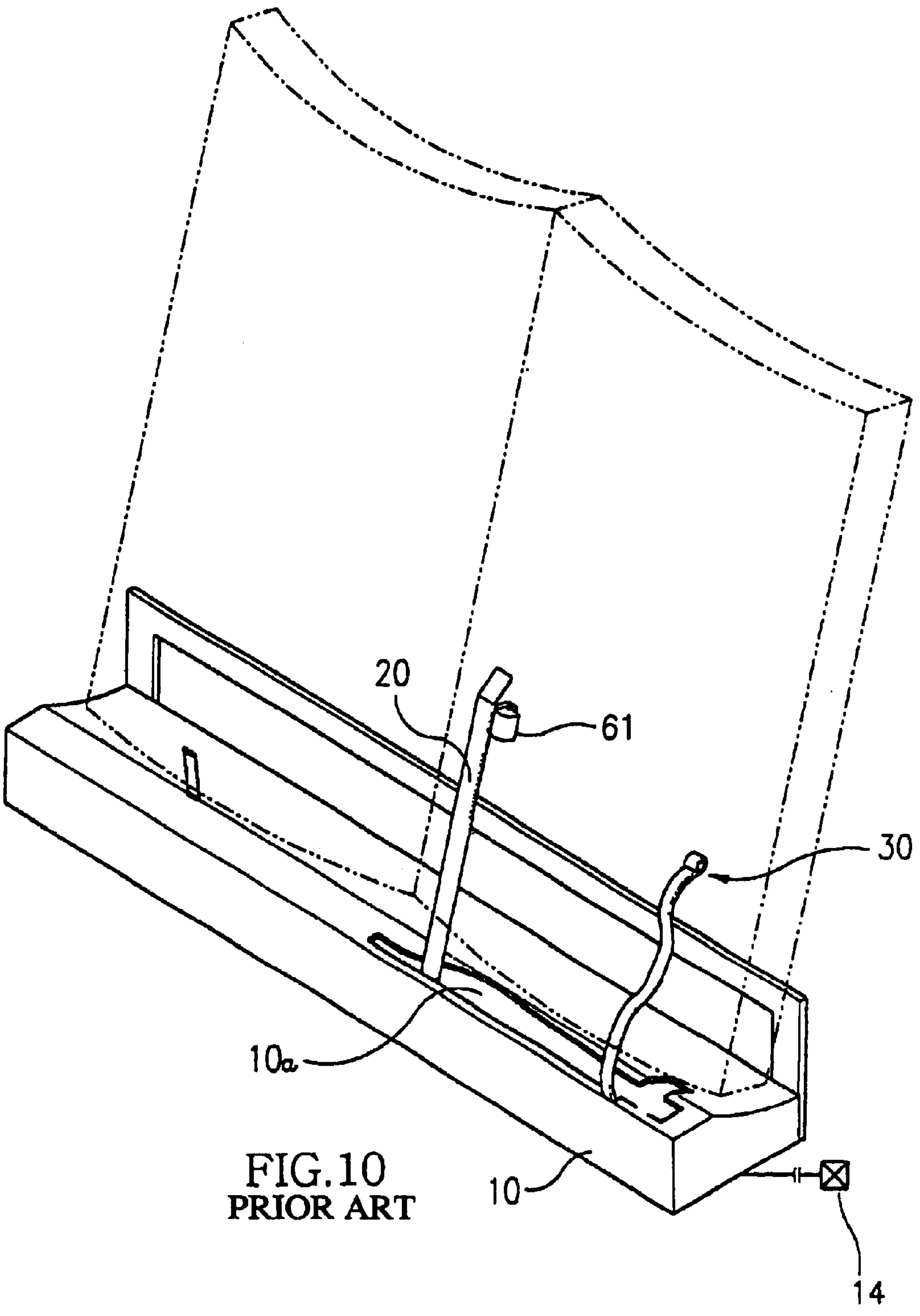
FIG.10 PRIOR ART
Figure 11:
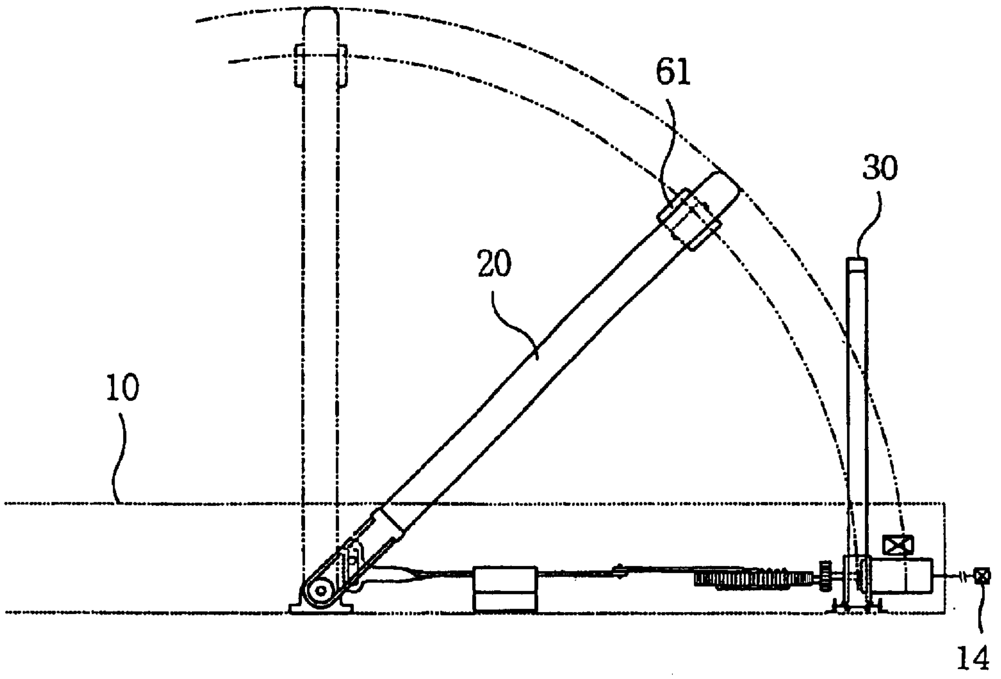
FIG. 11 PRIOR ART
FIG. 11 shows an operation of the conventional apparatus for turning pages of the book.

Upon initial movement of the pressing piece 203 along the arc, as the actuating lever 202 with the pressing piece 203 thereof positioned at the right lower end of the back surface of the page 161*a* is gradually moved toward a top position of the arc, the pressure contact piece 403 is moved toward the rear of the housing 150 to come into close contact with the next page 161*b* so that the next page 161*b* is prevented from following and being turned together with the previous page 161*a*, as shown in FIG. 8. Then, the actuating lever 202 is moved from the front surface of the page 161*a* to the back surface thereof to be positioned between the back surface of the page 161*a* and the next page 161*b*, further moved beyond the top position of the arc in the left direction until the movement thereof is completed in close contact with the back surface of the page 161*a*, as shown in FIG. 9. At this time, the page 161*a* has been completely turned.

The turned page is prevented from returning to the original position since it is caught in the supporting piece 157 formed at a left portion of the cover 159. Further, in the state where the page has been completely turned, the actuating lever 202 comes into contact with the first switch 153 so that the relay 152 converts the rotational direction of the geared motor 101. At this time, at initial timing of the conversion of the rotational direction, the actuating lever 202 is moved to a front end 104*b* of the guider slot 104 in accordance with the reverse rotation of the guider 103 so that the pressing piece 203 of the actuating lever 202 is spaced apart from the turned page. Thus, the pressing piece 203 is prevented from catching and returning the turned page 161*a* to the original position.

Meanwhile, when the actuating lever 202 returns to the initial position by pivoting along the guide groove 151, it comes into contact with the second switch 154 to turn off the electric power to the geared motor 101. In such a way, one cycle of the apparatus is completed.

Additionally, since a central portion of the rod-shaped actuating lever 202 is curved toward the front of the housing 150, the actuating lever 202 is prevented from interfering adjacent components while returning to the initial position after turning the page.

Therefore, whenever the user manipulates the power switch 160 with his/her foot, the geared motor 101 is driven and the pressure contact member 402 and the actuating lever 202 are repeatedly operated as described above, so that the pages of the book can be turned one by one.

INDUSTRIAL APPLICABILITY

As described above, according to the preferred embodiment of the present invention, the following advantages are obtained;

When a music performer manipulates the power switch to supply the electric power to the motor, the actuating lever is driven and pivoted by the motor so that it presses down and carries a page of a book to turn the pages one by one. Thus, the music performer can concentrate his/her attention on his/her performance of a music instrument.

Further, when the actuating lever turns pages of the book and then returns to the initial position, the actuating lever can be prevented from interfering with the adjacent components densely disposed in a narrow space within the housing. The width of the guide groove is minimized to prevent the page of the book from being caught in the guide groove and foreign materials such as dust from being introduced into the guide groove.

Moreover, the pressure contact piece for contacting and carrying the central lower portion of the page of the book is properly controlled in view of its contacting/separating direction and contact time so as to prevent the pressing piece from slipping on the page of the book and the page from being turned back by separating the pressing piece from the page when the actuating lever returns to the initial position.

What is claimed is:

1. An improved apparatus for turning pages of a book, including a housing 150 in which a geared motor 101 rotatable in forward and reverse directions and associated with an actuating lever 202 is installed and a backing plate for supporting the book thereon is formed; and a cover of the housing 150 provided with a guide groove 151 guiding the actuating lever 202 and with a supporting piece for fixing the page of the book which has been turned, the improvement comprising:

a rotational-direction changing unit 100 having a guider 103 formed on a side of a reduction gear 102 for finally reducing a rotational speed of the geared motor 101;

a pivoting unit 200 having the actuating lever 202 of which a lower end is hingedly secured on a pivoting shaft 201 and the other upper end is formed with a pressing piece 203 fixed thereto and which extends through a guide slot 104;

a pressing/restraining unit 300 having a helical depressing piece 301 which surrounds the other upper end of the actuating lever 202 and of which a lower end is fixed through a pin 305 to a fixing member 303 that is fixed through a pin 302 to the housing 150, and elastic members 304 and 306 connected to the fixing member 303 and a lower end of the depressing piece 301, respectively; and a contacting/releasing unit 400 having a stopper 409 interlocked with a crankshaft 401, and a pressure contact member 402 connected through a wire 406 and an elastic member 410 to the stopper 409 and connected to an elastic member 411 so that the pressure contact member 402 can pivot in a fore and aft direction.

2. The apparatus as claimed in claim 1, wherein an upper end of the pressure contact member 402 and a back surface of the pressing piece 203 are provided with inverted U-shaped elastic pieces 204 and 404, respectively.

3. The apparatus as claimed in claim 1, wherein the fixing member 303 is hingedly secured on the housing 150 through the pin 302; one ends of the elastic members 304 and 306 are fixed to an upper side portion of the fixing member 303 and to a lower portion of the helical depressing piece 301, respectively; and the other ends thereof are fixed to respective projections formed on of a floor of the housing 150.

4. The apparatus as claimed in claim 1, further comprising a first switch 153 which is in contact with the actuating lever 202 when the actuating lever 202 is positioned at a left end 151*a* of the guide groove 151, and a second switch 154 which is in contact with the actuating lever 202 when the actuating lever 202 returns to an initial position.

5. The apparatus as claimed in claim 1, wherein the actuating lever 202 is made in the form of a rod of which a central portion is curved toward the front of the housing 150.

6. The apparatus as claimed in claim 1, further comprising an elastic member 205 of which one end is fixed to a side end of the pivoting shaft 201 and the other end is fixed to the lower end of the actuating lever 202.

7. The apparatus as claimed in claim 1, further comprising a crank-shaped guide piece 166 of which one end is fixed to a floor of the housing 150 and the other end is raised to an initial height of the pressing piece 203 and which has a roller at a portion of the other end to be in contact with the pressing piece 203.

8. The apparatus as claimed in claim 1, wherein the guide slot 104 is an elongated slot formed on the guider 103 at a predetermined angle in the fore and aft direction.

9. The apparatus as claimed in claim 1, wherein a free end of the crankshaft 401 causes a second hook piece 408 formed on the bottom of the stopper 409 to be moved in both an upper and down direction and a left and right direction.

* * * * *